United States Patent
Chen et al.

(10) Patent No.: US 9,614,363 B2
(45) Date of Patent: Apr. 4, 2017

(54) UNDER VOLTAGE PROTECTION DEVICE

(71) Applicant: POWER MATE TECHNOLOGY CO., LTD., Taichung (TW)

(72) Inventors: Lien-Hsing Chen, Taichung (TW); Cheng-Te Tsai, Taichung (TW); Sheng-Ken Huang, Taichung (TW)

(73) Assignee: Power Mate Technology Co., Ltd., Taichung (TW)

( * ) Notice: Subject to any disclaimer, the term of this patent is extended or adjusted under 35 U.S.C. 154(b) by 32 days.

(21) Appl. No.: 14/865,913

(22) Filed: Sep. 25, 2015

(65) Prior Publication Data

US 2016/0094024 A1 Mar. 31, 2016

(30) Foreign Application Priority Data

Sep. 25, 2014 (TW) .............................. 103133324 A

(51) Int. Cl.
*H02H 3/00* (2006.01)
*H02H 3/24* (2006.01)

(52) U.S. Cl.
CPC ..................................... *H02H 3/24* (2013.01)

(58) Field of Classification Search
USPC .......................................................... 361/86
See application file for complete search history.

(56) References Cited

U.S. PATENT DOCUMENTS

| | | | | |
|---|---|---|---|---|
| 3,281,639 A | * | 10/1966 | Potter | H02J 7/008 320/163 |
| 3,284,694 A | * | 11/1966 | Roof | H02P 9/305 322/28 |
| 3,300,704 A | * | 1/1967 | McMillen | H02J 7/0091 320/137 |
| 3,663,943 A | * | 5/1972 | Nakajima | H02M 7/1555 307/33 |
| 3,670,246 A | * | 6/1972 | Gately | G01R 19/16538 324/133 |
| RE27,868 E | * | 1/1974 | Porter | H02J 7/14 290/31 |
| 3,792,313 A | * | 2/1974 | Conrad | H02H 3/093 361/94 |

(Continued)

FOREIGN PATENT DOCUMENTS

TW I354423 B 12/2011

*Primary Examiner* — Ronald W Leja
(74) *Attorney, Agent, or Firm* — Muncy, Geissler, Olds & Lowe, P.C.

(57) ABSTRACT

An under voltage protection device includes a voltage detector and a starting unit. The voltage detector includes a diode, a variable resistor, a transistor and a fixed-resistance resistor. The starting unit includes a second transistor. When a voltage of the external voltage source is smaller than a voltage of the diode, a voltage between an emitter node and an collector node of the first transistor is smaller than a threshold voltage present between a gate node of and a source node of the second transistor such that the starting unit is turned off. When the voltage of the external voltage source is larger than the voltage of the diode, the voltage between the emitter node and the collector node is larger than the threshold voltage present between the gate node and the source node such that the starting unit is turned on.

26 Claims, 2 Drawing Sheets

(56) References Cited

U.S. PATENT DOCUMENTS

| | | | | |
|---|---|---|---|---|
| 3,986,102 | A | * | 10/1976 | Morita ................... G05F 1/56 323/281 |
| 5,652,825 | A | * | 7/1997 | Schmider ............ H02M 7/2176 318/814 |
| 2007/0014159 | A1 | | 1/2007 | Chen et al. |
| 2008/0049466 | A1 | * | 2/2008 | Cho ....................... H02M 1/32 363/53 |
| 2011/0127984 | A1 | * | 6/2011 | Huang ................... G05F 1/565 323/284 |
| 2016/0094024 | A1 | * | 3/2016 | Chen ....................... H02H 3/24 361/86 |

* cited by examiner

UNDER VOLTAGE PROTECTION DEVICE

BACKGROUND OF THE INVENTION

Field of the Invention

The present invention relates to a protection device, especially to an under voltage protection device.

Description of Prior Art

Line voltage may reduce or even become zero due to short fault and these results in damage to circuit or electric equipment. For example, the electric machine may have excessive current (multiple of rated current) caused by the breakdown thereof. The electric machine may suffer to excessively low voltage due to self-starting of the electric machine after electric voltage resumes to supply. The electric machine will fail when line voltage is reduced to a threshold voltage and under voltage protection mechanism is activated to protect the electric machine. When line voltage is reduced below the threshold voltage, no-voltage protection mechanism is activated to protect the electric machine from self-starting.

Taiwan patent No. 1354423 (also published as US Patent Application No: 2007/0014159) discloses an under voltage protection device. As shown in FIG. 2 of this patent, the under voltage protection device comprises a starting unit and a voltage detector with a resistor R3, a Zener diode D4, a comparator U1 and a voltage divider (R4, R5). The starting unit has two first diodes D1, a plurality of resistors R1, R2, a first switch Q1, a second switch Q2, a second diode D2, a Zener diode D3 and a capacitor C1.

In above-mentioned under voltage protection device, the voltage detector first receives an input voltage divided by the voltage divider (R4, R5) and then the comparator U1 compares the divided input voltage with a reference voltage. When the divided input voltage is higher than the reference voltage, the comparator U1 sends a positive output voltage to turn on the second switch Q2 and then turn on the first switch Q1 to activate the fan. On the contrary, when the divided input voltage is smaller than the reference voltage, the comparator U1 sends a negative output voltage to turn off the second switch Q2 and then turn off the first switch Q1 to stop the fan, thus providing under voltage protection.

However, the above mentioned under voltage protection device uses considerable amount of electronic component and is difficult to manufacture. Moreover, the voltage divider (R4, R5) uses resistors R4, R5 of fixed resistance and the under voltage protection device cannot be adapted to input voltages of different amounts. The application of the above mentioned under voltage protection device is limited.

SUMMARY OF THE INVENTION

It is an object of the present invention to provide an under voltage protection device with less components and simple assembling task, thus greatly reducing cost.

It is another object of the present invention to provide an under voltage protection device capable of adjusting resistance according to the magnitude of the external voltage source to render it applicable to external voltage source of various magnitudes.

Accordingly the present invention provides an under voltage protection device electrically connecting with an external voltage source and comprising: a voltage detector comprising a diode, a variable resistor, a transistor and a fixed-resistance resistor, wherein the diode has an input electrically connecting with the external voltage source and an output, the variable resistor has a first node, a second node and a third node, the first node of the variable resistor electrically connecting with a ground of the under voltage protection device, the third node of the variable resistor electrically connecting with the output of the diode, the first transistor has a collector node electrically connecting with the first node of the variable resistor and the ground, an emitter node and a base node electrically connecting with the second node of the variable resistor, the fixed-resistance resistor has an input electrically connecting with an operation voltage of the under voltage protection device and an output electrically connecting with the emitter node of the first transistor; and a starting unit comprising a second transistor, the second transistor having a source node, a drain node and a gate node, wherein the source node of the second transistor electrically connects with the collector node of the first transistor and the ground, the gate node of the second transistor electrically connects with the output of the resistor and the emitter node of the first transistor, the drain node of the second transistor electrically connects with the operation voltage of the under voltage protection device, when a voltage of the external voltage source is smaller than a voltage of the diode, a voltage between the emitter node and the collector node is smaller than a threshold voltage present between the gate node of the second transistor and the source node of the second transistor such that the second transistor is turned off and the starting unit is turned off; when the voltage of the external voltage source is larger than the voltage of the diode, the voltage between the emitter node and the collector node is larger than the threshold voltage present between the gate node of the second transistor and the source node of the second transistor such that the second transistor is turned on and the starting unit is turned on.

According to one aspect of the present invention, the input of the diode electrically connects with a positive terminal of the external voltage source, a voltage range of the external voltage source is 0~100V.

According to another aspect of the present invention, the diode is a Zener diode and a voltage range of the Zener diode is 2.0~62V.

According to still another aspect of the present invention, the first node of the variable resistor electrically connects with a negative terminal of the external voltage source.

According to still another aspect of the present invention, the first transistor is a PNP transistor.

According to still another aspect of the present invention, the second transistor is an N channel depletion mode MOSFET.

According to still another aspect of the present invention, the voltage of the external voltage source is smaller than the voltage of the diode, the voltage between the emitter node and the collector node is 0.5~0.9V.

According to still another aspect of the present invention, the voltage of the external voltage source is larger than the voltage of the diode, the voltage between the emitter node and the collector node is equal to a voltage between the emitter node and the base node plus a voltage between the base node and the ground.

According to still another aspect of the present invention, the voltage between the base node and the ground is equal to a division voltage of a difference between the external voltage source and the voltage of the diode.

According to still another aspect of the present invention, a resistance of the variable resistor is adjusted according to a voltage value of the external voltage source, thus controlling an output voltage provided by the variable resistor, wherein a resistance range of the variable resistor is 0~500 KΩ.

Accordingly the present invention provides an under voltage protection device electrically connecting with an external voltage source and comprising: a voltage detector comprising a diode, a variable resistor, a transistor and a fixed-resistance resistor, wherein the diode has an input electrically connecting with the external voltage source and an output, the variable resistor has a first node, a second node and a third node, the first node of the variable resistor electrically connecting with a ground of the under voltage protection device, the third node of the variable resistor electrically connecting with the output of the diode, the first transistor has an emitter node electrically connecting with the first node of the variable resistor and the ground, a collector node and a base node electrically connecting with the second node of the variable resistor, the fixed-resistance resistor has an input electrically connecting with an operation voltage of the under voltage protection device and an output electrically connecting with the collector node of the first transistor; and a starting unit comprising a second transistor, the second transistor having a source node, a drain node and a gate node, wherein the source node of the second transistor electrically connects with the emitter node of the first transistor and the ground, the gate node of the second transistor electrically connects with the output of the resistor, and the collector node of the first transistor, the drain node of the second transistor electrically connects with the operation voltage of the under voltage protection device, an inverter having an input electrically connecting with the output of the fixed-resistance resistor and the collector node of the first transistor and an output electrically connecting with the gate node of the second transistor, when a voltage of the external voltage source is smaller than a voltage of the diode, a voltage between the collector node and the emitter node is equal to the operation voltage of the protection device such that the inverter has a low-level output and the second transistor is turned off; when the voltage of the external voltage source is larger than the voltage of the diode, a voltage between the base node of the first transistor and the emitter node of the first transistor is larger than a forward conduction voltage, and the voltage between the collector node and the emitter node is equal to a saturation voltage such that the inverter has a high-level output and the second transistor is turned on.

According to one aspect of the present invention, the input of the diode electrically connects with a positive terminal of the external voltage source, a voltage range of the external voltage source is 0~100V.

According to another aspect of the present invention, the diode is a Zener diode and a voltage range of the Zener diode is 2.0~62V.

According to still another aspect of the present invention, the first node of the variable resistor electrically connects with a negative terminal of the external voltage source.

According to still another aspect of the present invention, the first transistor is an NPN transistor.

According to still another aspect of the present invention, the second transistor is an N channel depletion mode MOSFET.

According to still another aspect of the present invention, when the voltage of the external voltage source is larger than the voltage of the diode, the voltage between the base node of the first transistor and the emitter node of the first transistor is 0.6~1.1V; and the voltage between the collector node and the emitter node is equal to the saturation voltage of 0.2~0.4V.

According to still another aspect of the present invention, the voltage between the base node and the ground is equal to a division voltage of a difference between the external voltage source and the voltage of the diode.

According to still another aspect of the present invention, a resistance of the variable resistor is adjusted according to a voltage value of the external voltage source, thus controlling an output voltage provided by the variable resistor, wherein a resistance range of the variable resistor is 0~500 KΩ.

Accordingly the present invention provides an under voltage protection device electrically connecting with an external voltage source and comprising: a voltage detector comprising a diode, a variable resistor, a transistor and a fixed-resistance resistor, wherein the diode has an input electrically connecting with the external voltage source and an output, the variable resistor has a first node, a second node and a third node, the first node of the variable resistor electrically connecting with a ground of the under voltage protection device, the third node of the variable resistor electrically connecting with the output of the diode, the first transistor has a source node electrically connecting with the first node of the variable resistor and the ground, a drain node and a gate node electrically connecting with the second node of the variable resistor, the fixed-resistance resistor has an input electrically connecting with an operation voltage of the under voltage protection device and an output electrically connecting with the drain node of the first transistor; and a starting unit comprising a second transistor, the second transistor having a source node, a drain node and a gate node, wherein the source node of the second transistor electrically connects with the emitter node of the first transistor and the ground, the gate node of the second transistor electrically connects with the output of the resistor and the collector node of the first transistor, the drain node of the second transistor electrically connects with the operation voltage of the under voltage protection device, an inverter having an input electrically connecting with the output of the fixed-resistance resistor and the collector node of the first transistor and an output electrically connecting with the gate node of the second transistor, when a voltage of the external voltage source is smaller than a voltage of the diode, a voltage between the collector node and the emitter node is equal to the operation voltage of the under voltage protection device such that the inverter has a low-level output and the second transistor is turned off; when the voltage of the external voltage source is larger than the voltage of the diode, a voltage between the base node of the first transistor and the emitter node of the first transistor is larger than a forward conduction voltage, and the voltage between the collector node and the emitter node is equal to a saturation voltage such that the inverter has a high-level output and the second transistor is turned on.

According to one aspect of the present invention, the input of the diode electrically connects with a positive terminal of the external voltage source, wherein a range of the external voltage source is 0~100V.

According to another aspect of the present invention, the diode is a Zener diode and a voltage range of the Zener diode is 2.0~62V.

According to still another aspect of the present invention, the first node of the variable resistor electrically connects with a negative terminal of the external voltage source.

According to still another aspect of the present invention, the first transistor and the second transistor are N channel depletion mode MOSFETs.

According to still another aspect of the present invention, the voltage between the base node and the ground is equal to a division voltage of a difference between the external voltage source and the voltage of the diode.

According to still another aspect of the present invention, a resistance of the variable resistor is adjusted according to a voltage value of the external voltage source, thus controlling an output voltage provided by the variable resistor, wherein a resistance range of the variable resistor is 0~500 KΩ.

BRIEF DESCRIPTION OF DRAWING

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

DETAILED DESCRIPTION OF THE INVENTION

In cooperation with the attached drawings, the technical contents and detailed description of the present disclosed example are described thereinafter according to a preferable embodiment, being not used to limit its executing scope. Any equivalent variation and modification made according to appended claims is all covered by the claims claimed by the present disclosed example.

Figure 1:
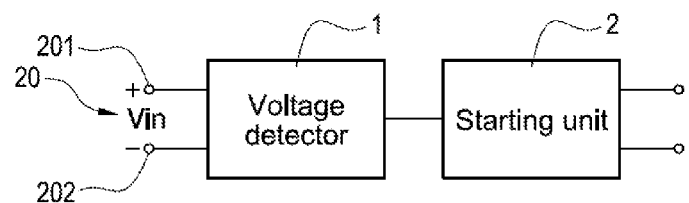
FIG. 1 shows a block diagram of the under voltage protection device according to an embodiment of the present invention.
Figure 2:
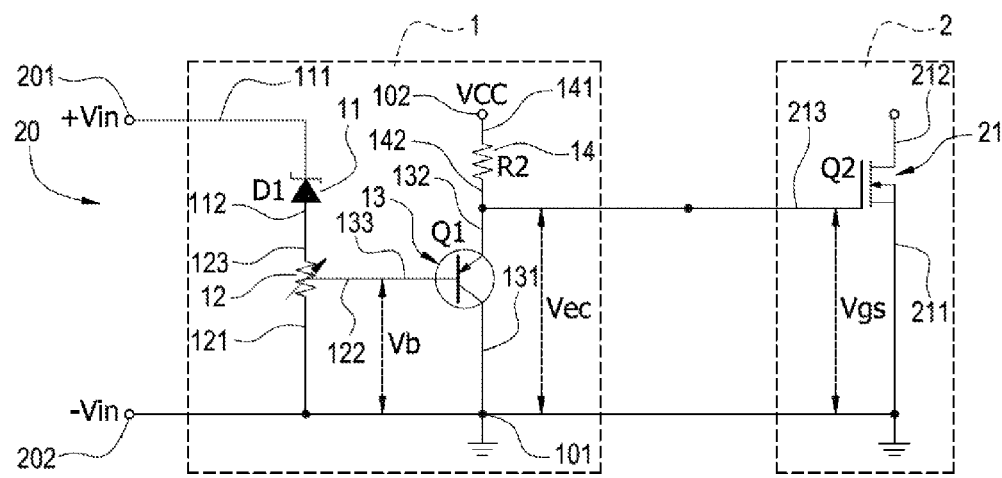
FIG. 2 shows the circuit diagram of the under voltage protection device according to an embodiment of the present invention.

FIG. 1 shows a block diagram of the under voltage protection device according to an embodiment of the present invention, and FIG. 2 shows the circuit diagram of the under voltage protection device according to the embodiment of the present invention. As shown in those figures, the under voltage protection device 10 of the present invention comprises a voltage detector 1 and a starting unit 2.

The voltage detector 1 comprises a first diode (D1) 11, a variable resistor (R1) 12, a transistor (Q1) 13 and a fixed-resistance resistor, hereinafter briefly referred to resistor, (R2) 14.

The diode 11 has an input 111 and an output 112, where the input 111 electrically connects with the positive terminal (+Vin) 201 of an external power source 20. In the shown embodiment, the diode is a Zener diode and the Zener voltage range of the Zener diode is 2.0~62V.

The variable resistor 12 has a first node 121, a second node 122 and a third node 123. The first node 121 of the variable resistor 12 electrically connects with the negative terminal (−Vin) 202 of an external voltage source 20, the second node 122 of the variable resistor 12 electrically connects with the base 133 of the transistor 13, and the third node 123 of the variable resistor 12 electrically connects with the output 112 of the diode 11. In the shown embodiment, the resistivity range of the variable resistor 12 is 0~500 KΩ.

The first transistor 13 has a collector node 131, an emitter node 132 and a base node 133. The collector node 131 of the first transistor 13 electrically connects with the first node 121 of the variable resistor 12 and the ground 101. The base node 133 of the first transistor 13 electrically connects with the second node 122 of the variable resistor 12. In the shown example, the transistor 13 is a PNP transistor.

The resistor 14 has an input 141 and an output 142, where the input 141 electrically connects with the operation voltage (Vcc) 102 of the protection device 10 and the output 142 electrically connects with the emitter node 132 of the transistor 13.

The starting unit 2 comprises a second transistor 21. The second transistor 21 has a source node 211, a drain node 212 and a gate node 213. The source node 211 of the second transistor 21 electrically connects with the collector node 131 of the first transistor 13 and the ground 101. The gate node 213 of the second transistor 21 electrically connects with the output 142 of the resistor 14 and the emitter node 132 of the first transistor 13. The drain node 212 of the second transistor 21 electrically connects with the operation voltage of the protection device. In the shown embodiment, the second transistor 21 is an N channel depletion mode MOSFET.

The operation principle of the invention is as follows: the voltage level Vec between the emitter node 132 and the collector node 131 is controlled by the voltage drop across the diode 11 and the variable resistor 12 and by the voltage Veb between the emitter node 132 and the base node 133.

When the external voltage source (Vin) 20 (the voltage source generally has voltage range between 0 and 100V) is smaller than the voltage Vz of the diode 11, the voltage Vec between the emitter node 132 and the collector node 131 is around 0.5~0.9V (namely the Veb voltage). At this time, the voltage Vec between the emitter node 132 and the collector node 131 is smaller than a threshold voltage, namely the voltage Vgs between the gate node 213 of the second transistor 21 and the source node 211 of the second transistor 21. Therefore, the second transistor 21 is turned off and the starting unit 2 is turned off.

When the external voltage source (Vin) 20 is larger than the voltage Vz of the diode 11, the voltage Vec between the emitter node 132 and the collector node 131 is equal to the voltage Veb between the emitter node 132 and the base node 133 plus the voltage Vb between the base node 133 and the ground 101, namely, Vec=Veb+Vb. At this time, the voltage Vec between the emitter node 132 and the collector node 131 is larger than a threshold voltage, namely the voltage Vgs between the gate node 213 of the second transistor 21 and the source node 211 of the second transistor 21. Therefore, the second transistor 21 is turned on and the starting unit 2 is turned on. In the shown embodiment, the voltage Vb between the base 133 and the ground 101 is equal to the division voltage of the difference between the external voltage source 20 and the voltage Vz of the diode 11.

Figure 3:
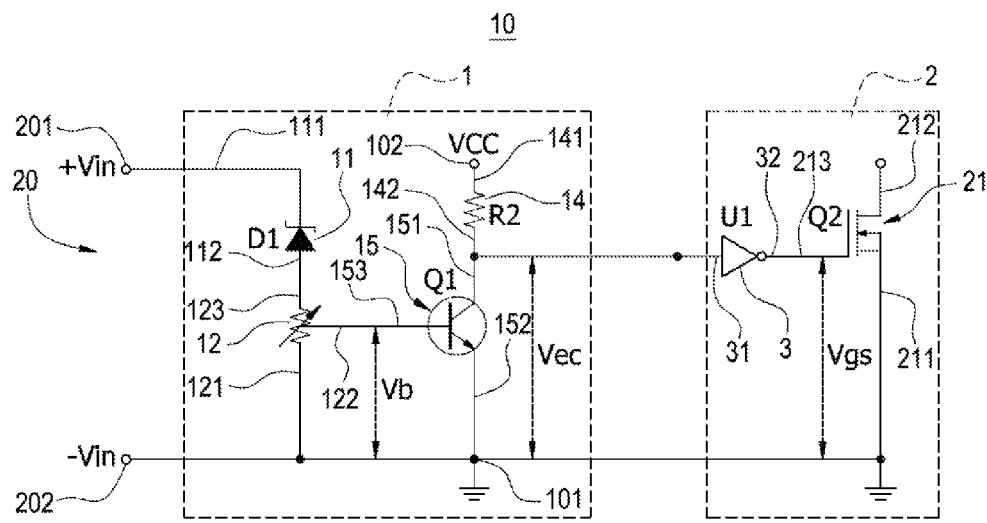
FIG. 3 shows the circuit diagram of the under voltage protection device according to another embodiment of the present invention.

FIG. 3 shows the circuit diagram of the under voltage protection device according to another embodiment of the present invention. The embodiment shown in FIG. 3 is similar to that shown in FIG. 2 except that the first transistor 15 in FIG. 3 is an NPN transistor. The transistor 15 has a collector node 151, an emitter node 152 and a base node 153. The emitter node 152 of the first transistor 15 electrically connects with the first node 121 of the variable resistor 12 and the ground 101. The base node 153 of the first transistor 15 electrically connects with the second node 122 of the variable resistor 12. The collector node 151 of the first transistor 15 electrically connects with the output 142 of the resistor 14. Moreover, an inverter 3 electrically connects between a connection point (between the collector node 151 of the first transistor 15 and the output 142 of the resistor 14) and the starting unit 2. More particularly, the input 31 of the inverter 3 electrically connects with the connection point between the collector node 151 of the first transistor 15 and the output 142 of the resistor 14, the output 32 of the inverter 3 electrically connects with the gate node 213 of the second transistor 21.

When Vin<VD1, the collect to emitter voltage Vce of the first transistor 15 is equal to the operation voltage Vcc. Therefore, the inverter 3 has low-level output and the second transistor 21 of the starting unit 2 is turned off.

When Vin>VD1, the base to emitter voltage Vbe of the first transistor 15 is forward bias with voltage of 0.6V~1.1V such that the collect to emitter voltage Vce of the first transistor 15 is equal to a saturation voltage (0.2~0.4V). Therefore, the inverter 3 has high-level output and the second transistor 21 of the starting unit 2 is turned on.

The voltage Vb between the base node 153 and the ground 101 is equal to the division voltage of the difference between the external voltage source 20 and the voltage Vz of the diode 11.

Figure 4:
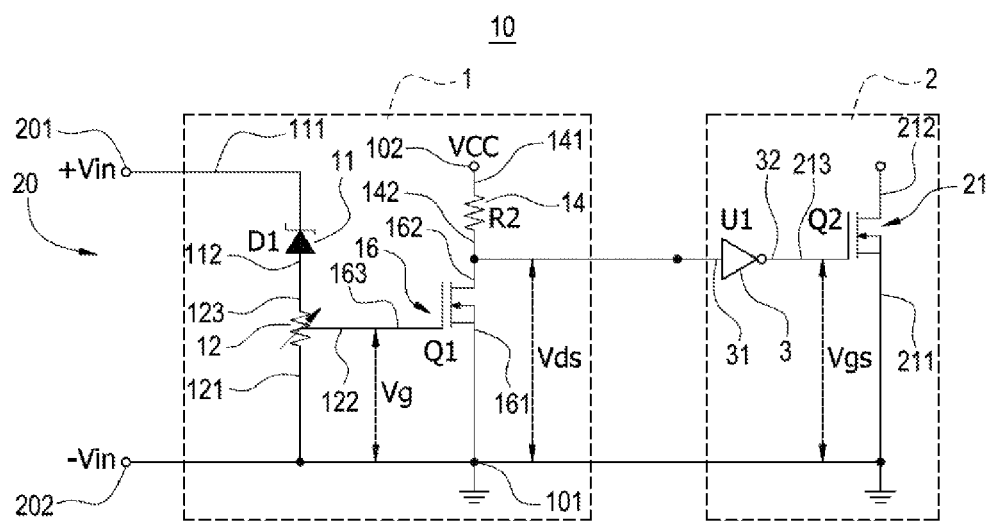
FIG. 4 shows the circuit diagram of the under voltage protection device according to still another embodiment of the present invention.

FIG. 4 shows the circuit diagram of the under voltage protection device according to still another embodiment of the present invention. The embodiment shown in FIG. 4 is similar to that shown in FIG. 2 except that the first transistor 16 in FIG. 4 is an N channel depletion mode MOSFET. The first transistor 16 has a source node 161, a drain node 162 and a gate node 163. The source node 161 of the first transistor 16 electrically connects with the first node 121 of the variable resistor 12 and the ground 101. The drain node 162 of the first transistor 16 electrically connects with the output 142 of the resistor 14. The gate node 163 of the first transistor 16 electrically connects with the second node 122 of the variable resistor 12. Moreover, an inverter 3 electrically connects between a connection point (between the drain node 162 of the first transistor 16 and the output 142 of the resistor 14) and the starting unit 2. More particularly, the input 31 of the inverter 3 electrically connects with the connection point between the drain node 162 of the first transistor 16 and the output 142 of the resistor 14, the output 32 of the inverter 3 electrically connects with the gate node 213 of the second transistor 21.

When Vin<VD1, the gate to source voltage Vgs of the first transistor 16 is smaller than the gate-source threshold voltage (Vth) and the first transistor 16 is turned off. The drain to source voltage Vds is equal to operation voltage Vcc. Therefore, the inverter 3 has low-level output and the second transistor 21 of the starting unit 2 is turned off.

When Vin>VD1, the gate to source voltage Vgs of the first transistor 16 is larger than the gate-source threshold voltage (Vth) and the first transistor 16 is turned on. The drain to source voltage Vds is equal to zero. Therefore, the inverter 3 has high-level output and the second transistor 21 of the starting unit 2 is turned on.

The voltage Vg between the gate node 163 and the ground 101 is equal to the division voltage of the difference between the external voltage source 20 and the voltage Vz of the diode 11.

The above-mentioned embodiments use less electronic components to implement the under voltage protection device 10. The manufacture is simplified with less cost. The life of load can be prolonged in under voltage condition.

Moreover, the resistance of the variable resistor 12 can be advantageously adjusted according to the value of the voltage source (Vin) 20, thus controlling an output voltage provided by the variable resistor 12. The under voltage protection device 10 of the present invention can be adapted to use in voltage source of various magnitudes.

The foregoing descriptions of embodiments of the disclosed example have been presented only for purposes of illustration and description. They are not intended to be exhaustive or to limit the disclosed example to the forms disclosed. Accordingly, many modifications and variations will be apparent to practitioners skilled in the art. Additionally, the above disclosure is not intended to limit the disclosed example. The scope of the disclosed example is defined by the appended.

What is claimed is:

1. An under voltage protection device electrically connecting with an external voltage source and comprising:
   a voltage detector comprising a diode, a variable resistor, a first transistor and a fixed-resistance resistor, wherein the diode has an input electrically connecting with the external voltage source and an output, the variable resistor has a first node, a second node and a third node, the first node of the variable resistor electrically connecting with a ground of the under voltage protection device, the third node of the variable resistor electrically connecting with the output of the diode, the first transistor has a collector node electrically connecting with the first node of the variable resistor and the ground, an emitter node and a base node electrically connecting with the second node of the variable resistor, the fixed-resistance resistor has an input electrically connecting with an operation voltage of the under voltage protection device and an output electrically connecting with the emitter node of the first transistor; and
   a starting unit comprising a second transistor, the second transistor having a source node, a drain node and a gate node, wherein the source node of the second transistor electrically connects with the collector node of the first transistor and the ground, the gate node of the second transistor electrically connects with the output of the fixed-resistance resistor and the emitter node of the first transistor, the drain node of the second transistor electrically connects with the operation voltage of the under voltage protection device,
   when a voltage of the external voltage source is smaller than a voltage of the diode, a voltage between the emitter node and the collector node is smaller than a threshold voltage present between the gate node of the second transistor and the source node of the second transistor such that the second transistor is turned off and the starting unit is turned off;
   when the voltage of the external voltage source is larger than the voltage of the diode, the voltage between the emitter node and the collector node is larger than the threshold voltage present between the gate node of the second transistor and the source node of the second transistor such that the second transistor is turned on and the starting unit is turned on.

2. The under voltage protection device in claim 1, wherein the input of the diode electrically connects with a positive terminal of the external voltage source, a voltage range of the external voltage source is 0~100V.

3. The under voltage protection device in claim 2, wherein the diode is a Zener diode and a voltage range of the Zener diode is 2.0~62V.

4. The under voltage protection device in claim 3, wherein the first node of the variable resistor electrically connects with a negative terminal of the external voltage source.

5. The under voltage protection device in claim 4, wherein the first transistor is a PNP transistor.

6. The under voltage protection device in claim 5, wherein the second transistor is an N channel depletion mode MOSFET.

7. The under voltage protection device in claim 6, when the voltage of the external voltage source is smaller than the voltage of the diode, the voltage between the emitter node and the collector node is 0.5~0.9V.

8. The under voltage protection device in claim 7, when the voltage of the external voltage source is larger than the voltage of the diode, the voltage between the emitter node and the collector node is equal to a voltage between the emitter node and the base node plus a voltage between the base node and the ground.

9. The under voltage protection device in claim 8, wherein the voltage between the base node and the ground is equal to a division voltage of a difference between the external voltage source and the voltage of the diode.

10. The under voltage protection device in claim 9, wherein a resistance of the variable resistor is adjusted according to a voltage value of the external voltage source, thus controlling an output voltage provided by the variable resistor, wherein a resistance range of the variable resistor is 0~500 KΩ.

11. An under voltage protection device electrically connecting with an external voltage source and comprising:
   a voltage detector comprising a diode, a variable resistor, a first transistor and a fixed-resistance resistor, wherein the diode has an input electrically connecting with the external voltage source and an output, the variable resistor has a first node, a second node and a third node, the first node of the variable resistor electrically connecting with a ground of the under voltage protection device, the third node of the variable resistor electrically connecting with the output of the diode, the first transistor has an emitter node electrically connecting with the first node of the variable resistor and the ground, a collector node and a base node electrically connecting with the second node of the variable resistor, the fixed-resistance resistor has an input electrically connecting with an operation voltage of the under voltage protection device and an output electrically connecting with the collector node of the first transistor; and
   a starting unit comprising a second transistor, the second transistor having a source node, a drain node and a gate node, wherein the source node of the second transistor electrically connects with the emitter node of the first transistor and the ground, the gate node of the second transistor electrically connects with the output of the fixed-resistance resistor, and the collector node of the first transistor, the drain node of the second transistor electrically connects with the operation voltage of the under voltage protection device,
   an inverter having an input electrically connecting with the output of the fixed-resistance resistor and the collector node of the first transistor and an output electrically connecting with the gate node of the second transistor,
   when a voltage of the external voltage source is smaller than a voltage of the diode, a voltage between the collector node and the emitter node is equal to the operation voltage of the protection device such that the inverter has a low-level output and the second transistor is turned off;
   when the voltage of the external voltage source is larger than the voltage of the diode, a voltage between the base node of the first transistor and the emitter node of the first transistor is larger than a forward conduction voltage, and the voltage between the collector node and the emitter node is equal to a saturation voltage such that the inverter has a high-level output and the second transistor is turned on.

12. The under voltage protection device in claim 11, wherein the input of the diode electrically connects with a positive terminal of the external voltage source, a voltage range of the external voltage source is 0~100V.

13. The under voltage protection device in claim 12, wherein the diode is a Zener diode and a voltage range of the Zener diode is 2.0~62V.

14. The under voltage protection device in claim 13, wherein the first node of the variable resistor electrically connects with a negative terminal of the external voltage source.

15. The under voltage protection device in claim 14, wherein the first transistor is an NPN transistor.

16. The under voltage protection device in claim 15, wherein the second transistor is an N channel depletion mode MOSFET.

17. The under voltage protection device in claim 16, when the voltage of the external voltage source is larger than the voltage of the diode, the voltage between the base node of the first transistor and the emitter node of the first transistor is 0.6~1.1V; and the voltage between the collector node and the emitter node is equal to the saturation voltage of 0.2~0.4V.

18. The under voltage protection device in claim 17, wherein the voltage between the base node and the ground is equal to a division voltage of a difference between the external voltage source and the voltage of the diode.

19. The under voltage protection device in claim 18, wherein a resistance of the variable resistor is adjusted according to a voltage value of the external voltage source, thus controlling an output voltage provided by the variable resistor, wherein a resistance range of the variable resistor is 0~500 KΩ.

20. An under voltage protection device electrically connecting with an external voltage source and comprising:
   a voltage detector comprising a diode, a variable resistor, a first transistor and a fixed-resistance resistor, wherein the diode has an input electrically connecting with the external voltage source and an output, the variable resistor has a first node, a second node and a third node, the first node of the variable resistor electrically connecting with a ground of the under voltage protection device, the third node of the variable resistor electrically connecting with the output of the diode, the first transistor has a source node electrically connecting with the first node of the variable resistor and the ground, a drain node and a gate node electrically connecting with the second node of the variable resistor, the fixed-resistance resistor has an input electrically connecting with an operation voltage of the under voltage protection device and an output electrically connecting with the drain node of the first transistor; and
   a starting unit comprising a second transistor, the second transistor having a source node, a drain node and a gate node, wherein the source node of the second transistor electrically connects with the source node of the first transistor and the ground, the gate node of the second transistor electrically connects with the output of the fixed-resistance resistor and the drain node of the first transistor, the drain node of the second transistor electrically connects with the operation voltage of the under voltage protection device, an inverter having an input electrically connecting with the output of the fixed-resistance resistor and the drain node of the first transistor and an output electrically connecting with the gate node of the second transistor, when a voltage of the external voltage source is smaller than a voltage of the diode, a voltage between the drain node and the source node is equal to the operation voltage of the under voltage protection device such that the inverter has a low-level output and the second transistor is turned off;

when the voltage of the external voltage source is larger than the voltage of the diode, a voltage between the gate node of the first transistor and the source node of the first transistor is larger than a forward conduction voltage, and the voltage between the drain node and the source node is equal to a saturation voltage such that the inverter has a high-level output and the second transistor is turned on.

21. The under voltage protection device in claim 20, wherein the input of the diode electrically connects with a positive terminal of the external voltage source, wherein a range of the external voltage source is 0~100V.

22. The under voltage protection device in claim 21, wherein the diode is a Zener diode and a voltage range of the Zener diode is 2.0~62V.

23. The under voltage protection device in claim 22, wherein the first node of the variable resistor electrically connects with a negative terminal of the external voltage source.

24. The under voltage protection device in claim 23, wherein the first transistor and the second transistor are N channel depletion mode MOSFETs.

25. The under voltage protection device in claim 24, wherein the voltage between the gate node and the ground is equal to a division voltage of a difference between the external voltage source and the voltage of the diode.

26. The under voltage protection device in claim 25, wherein a resistance of the variable resistor is adjusted according to a voltage value of the external voltage source, thus controlling an output voltage provided by the variable resistor, wherein a resistance range of the variable resistor is 0~500 KΩ.

* * * * *